United States Patent
Madan et al.

(10) Patent No.: US 8,265,019 B2
(45) Date of Patent: Sep. 11, 2012

(54) SCHEDULING A MIX OF BEST EFFORT (BE) AND DELAY QOS FLOWS

(75) Inventors: Ritesh K. Madan, Jersey City, NJ (US); Arnab Das, Bethesda, MD (US); Sundeep Rangan, Jersey City, NJ (US); Siddharth Ray, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 958 days.

(21) Appl. No.: 12/261,319

(22) Filed: Oct. 30, 2008

(65) Prior Publication Data

US 2009/0116439 A1 May 7, 2009

Related U.S. Application Data

(60) Provisional application No. 60/985,534, filed on Nov. 5, 2007.

(51) Int. Cl.
*H04W 4/00* (2009.01)
(52) U.S. Cl. ....................................................... 370/329
(58) Field of Classification Search .................... None
See application file for complete search history.

(56) References Cited

U.S. PATENT DOCUMENTS

| | | | | |
|---|---|---|---|---|
| 6,122,289 | A * | 9/2000 | Brown et al. | 370/465 |
| 2007/0297332 | A1* | 12/2007 | Broberg et al. | 370/235 |
| 2009/0003266 | A1* | 1/2009 | Stolyar et al. | 370/328 |

FOREIGN PATENT DOCUMENTS

| | | |
|---|---|---|
| JP | 2000286851 A | 10/2000 |
| JP | 2001223716 A | 8/2001 |
| JP | 2005218118 A | 8/2005 |
| WO | WO02009358 | 1/2002 |
| WO | WO2006055173 | 5/2006 |

OTHER PUBLICATIONS

International Search Report and Written Opinion—PCT/US2008/082424—International Search Authority, European Patent Office—Apr. 17, 2009.

Brain, et al., "An Experimental Study of Insider Attacks For OSPF Routing Protocol", IEEE, Brain Vetter, et al., 1997.

* cited by examiner

*Primary Examiner* — Yong Zhou
(74) *Attorney, Agent, or Firm* — Donald C. Kordich

(57) ABSTRACT

Systems and methodologies are described that facilitate dynamically adjusting scheduling priorities in relation to a combination of delay sensitive flows with delay requirements and best effort flows. The systems and methodologies provide optimal and efficient techniques to enable real time adjustment and assignment of bandwidth for a combination of best effort flows and delay sensitive flows. In particular, the bandwidth allocation is adjusted for each data packet such that delay requirements are met and the remaining bandwidth can be assigned to best effort flows.

36 Claims, 11 Drawing Sheets

SCHEDULING A MIX OF BEST EFFORT (BE) AND DELAY QOS FLOWS

CROSS-REFERENCE TO RELATED APPLICATIONS

This application claims the benefit of U.S. Provisional Patent application Ser. No. 60/985,534 entitled "SCHEDULING A MIX OF BEST EFFORT (BE) AND DELAY QOS FLOWS" which was filed Nov. 5, 2007. The entirety of the aforementioned application is herein incorporated by reference.

BACKGROUND

I. Field

The following description relates generally to wireless communications, and more particularly to optimizing Quality of Service (QoS) in relation to best effort flow and delay sensitive flows (delay QoS flows).

II. Background

Wireless communication systems are widely deployed to provide various types of communication; for instance, voice and/or data can be provided via such wireless communication systems. A typical wireless communication system, or network, can provide multiple users access to one or more shared resources (e.g., bandwidth, transmit power, . . . ). For instance, a system can use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations.

Wireless communication systems are widely deployed to provide various types of communication; for instance, voice and/or data can be provided via such wireless communication systems. A typical wireless communication system, or network, can provide multiple users access to one or more shared resources (e.g., bandwidth, transmit power, etc). For instance, a system can use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Quality of Service (QoS) of flows can play a key role in wireless data networks. In 6/27/20 z general, wireless communications can pose difficulties in regards to providing efficient and effective packet scheduling algorithms. For instance, wireless communication networks can include limited bandwidth, high error rate, transmission link variability, etc. which can prohibit the management of QoS flows. In terms of best effort flows and delay sensitive flows, typical solutions for QoS management include strict ordering for each respective type of flow. Yet, such conventional techniques have become obsolete in terms of providing efficient and effective packet scheduling.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
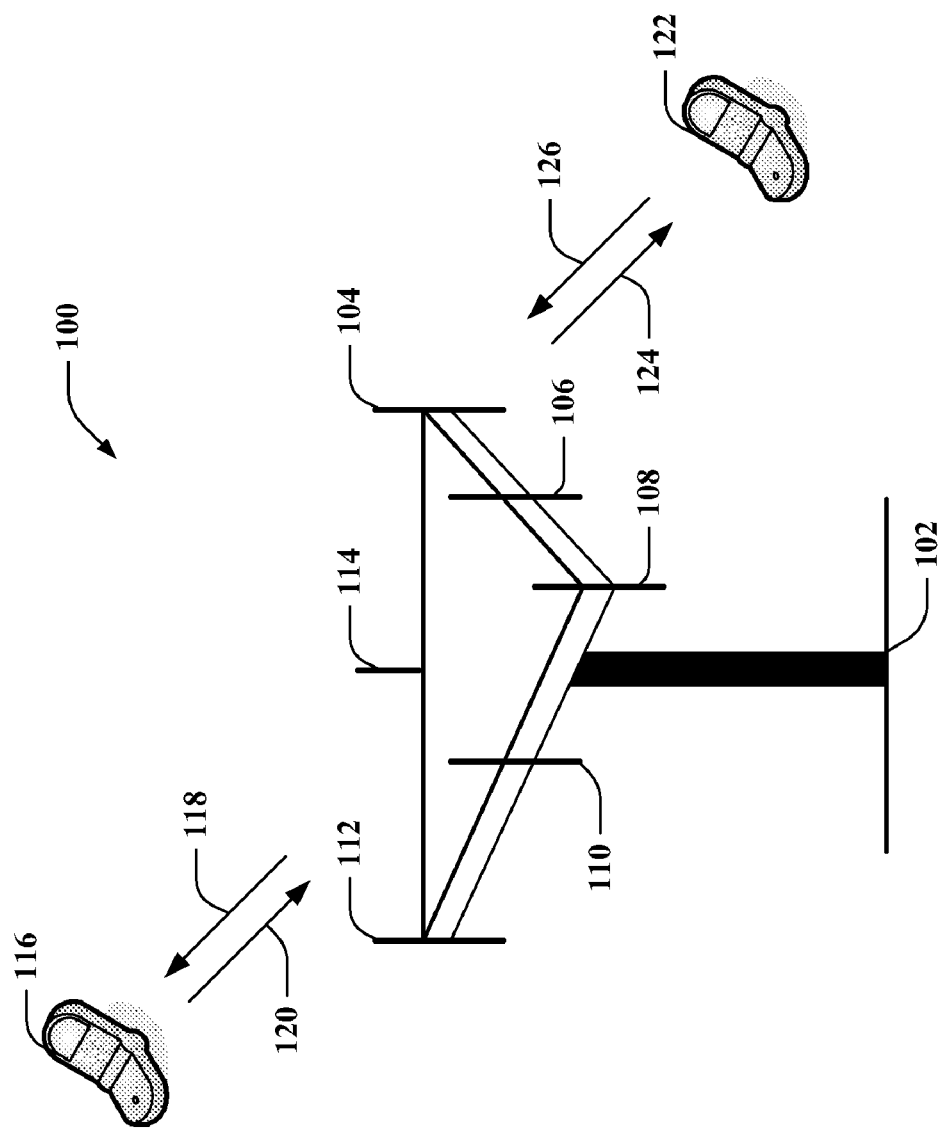
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "module," "system," "manager," "engine," "scheduler," "adapter," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA) and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits access terminals in terms of transmit power efficiency. Accordingly, SC-FDMA can be implemented as an uplink multiple access scheme in 3GPP Long Term Evolution (LTE) or Evolved UTRA.

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device(s) and can also be referred to as an access point, Node B, or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices.

Base station 102 (and/or each sector of base station 102) can employ one or more multiple access technologies (e.g., CDMA, TDMA, FDMA, OFDMA, . . . ). For instance, base station 102 can utilize a particular technology for communicating with mobile devices (e.g. mobile devices 116 and 122) upon a corresponding bandwidth. Moreover, if more than one technology is employed by base station 102, each technology can be associated with a respective bandwidth. The technologies described herein can include following: Global System for Mobile (GSM), General Packet Radio Service (GPRS), Enhanced Data Rates for GSM Evolution (EDGE), Universal Mobile Telecommunications System (UMTS), Wideband Code Division Multiple Access (W-CDMA), cdmaOne (IS-95), CDMA2000, Evolution-Data Optimized (EV-DO), Ultra Mobile Broadband (UMB), Worldwide Interoperability for Microwave Access (WiMAX), MediaFLO, Digital Multimedia Broadcasting (DMB), Digital Video Broadcasting—Handheld (DVB-H), etc. It is to be appreciated that the aforementioned listing of technologies is provided as an example and the claimed subject matter is not so limited; rather, substantially any wireless communication technology is intended to fall within the scope of the hereto appended claims.

Base station 102 can employ a first bandwidth with a first technology. Moreover, base station 102 can transmit a pilot corresponding to the first technology on a second bandwidth. According to an illustration, the second bandwidth can be leveraged by base station 102 and/or any disparate base station (not shown) for communication that utilizes any second technology. Moreover, the pilot can indicate the presence of the first technology (e.g., to a mobile device communicating via the second technology). For example, the pilot can use bit(s) to carry information about the presence of the first technology. Additionally, information such as a SectorID of the sector utilizing the first technology, a CarrierIndex indicating the first frequency bandwidth, and the like can be included in the pilot.

According to another example, the pilot can be a beacon (and/or a sequence of beacons). A beacon can be an OFDM symbol where a large fraction of the power is transmitted on one subcarrier or a few subcarriers (e.g., small number of subcarriers). Thus, the beacon provides a strong peak that can be observed by mobile devices, while interfering with data on a narrow portion of bandwidth (e.g., the remainder of the bandwidth can be unaffected by the beacon). Following this example, a first sector can communicate via CDMA on a first bandwidth and a second sector can communicate via OFDM on a second bandwidth. Accordingly, the first sector can signify the availability of CDMA on the first bandwidth (e.g., to mobile device(s) operating utilizing OFDM on the second bandwidth) by transmitting an OFDM beacon (or a sequence of OFDM beacons) upon the second bandwidth.

The subject innovation can provide efficient and optimal scheduling techniques in accordance with assigning bandwidth for best effort (BE) flows and delay sensitive flows (e.g., flows with delay requirements, delay QoS flows, etc.). The scheduling of best effort flows and flows with delay requirements can be efficiently managed in that the delay requirements can be met for the delay sensitive flows as well as allocating the remaining bandwidth to the best effort flows. It is to be appreciated that a best effort flow can be a flow which can be modeled as having elastic rate requirements (e.g., no minimum rate requirement yet the user experience associated with such flows gets better as the flow gets higher rates). In general, when there is a mix of best effort flows (BE) and delay sensitive flows (DS), the subject innovation can prioritize bandwidth to the delay sensitive flow. In particular, within scheduling, the delay requirements of delay sensitive flows can be met and the remaining resources or bandwidth can be allocated to the best effort flows.

Figure 2:
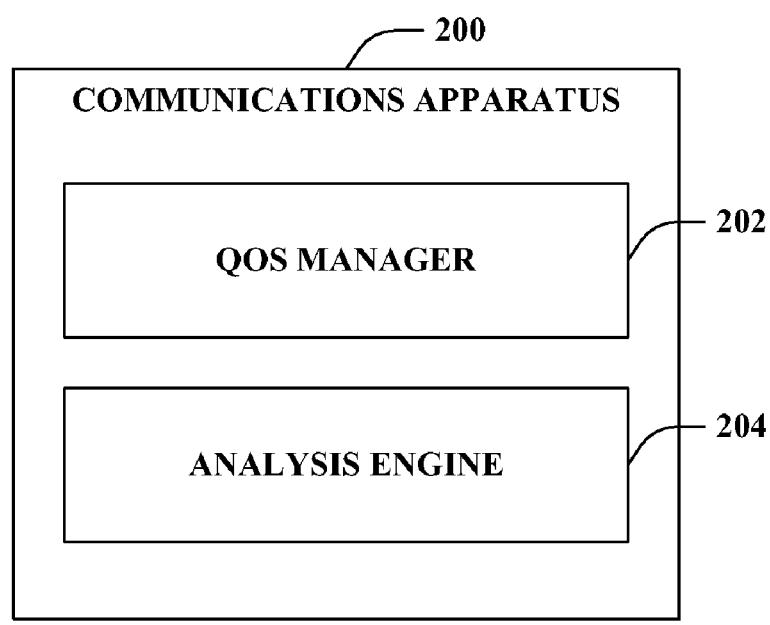
FIG. 2 is an illustration of an example communications apparatus for employment within a wireless communications environment.

Turning to FIG. 2, illustrated is a communications apparatus 200 for employment within a wireless communications environment. The communications apparatus 200 can be a base station or a portion thereof, a mobile device or a portion thereof, or substantially any communications apparatus that receives data transmitted in a wireless communications environment. In communications systems, communication timing between transmitters and receivers can require adjustment. Thus, the communications apparatus 200 employs components described below to facilitate scheduling bandwidth to a mix of best effort flows and delay sensitive flows. The communications apparatus 200 can include Quality of Service (QoS) manager 202 that can efficiently schedule allocation of bandwidth for flows, and an analysis engine 204 that can determine the bandwidth allocation and/or adjustment of bandwidth assignment for flows. The communications device 200 can receive at least one data packet in accordance with the allocation of bandwidth for the best effort flows and/or the delay sensitive flows. Thus, the communications device 200 can conserve bandwidth and/or resources by optimally managing best effort flows and delay sensitive flows for each data packet.

According to an example, the communications apparatus 200 can schedule a mix of delay sensitive flows and best effort flows, wherein the delay sensitive flows include a delay requirement or delay target. The analysis engine 204 can utilize a metric to compare the priorities of serving the packet of each kind of flow (e.g., best effort flow, delay sensitive flow) and the QoS manager 202 can enforce such priorities ascertained. A weight W can be employed to relate the priorities of each of the two classes. In particular, the priority of serving a delay sensitive flow can be $Wf_i(q_i(t), d_i(t), K_i^j(t))$, while that of serving a best effort flow is the marginal utility of the flow relative to the amount of bandwidth allocated to it. It is to be appreciated that $d_i(i)$ can be the head-of-line delay for a flow, $q_i(t)$ can be the buffer size (e.g., the sum of the number of bytes that are caches for a give flow and the estimated overheads/headers), and $K_i^j(t)$ can be the spectral efficiency.

Moreover, although not shown, it is to be appreciated that communications apparatus 200 can include memory that retains instructions with respect to receiving at least one of a delay sensitive flow with a delay requirement or a best effort flow, allocating a first portion of bandwidth to the delay sensitive flow, allocating a second portion of bandwidth to the best effort flow, reallocating the first portion of bandwidth to a reduced level of bandwidth and the second portion of bandwidth to an increased level of bandwidth if the delay requirement is met, reallocating the first portion of bandwidth to an increased level of bandwidth and the second portion of bandwidth to a reduced level of bandwidth if the delay requirement is not met, maintaining a level of bandwidth for the first portion of bandwidth and the second portion of bandwidth if the delay requirement is equivalent to the first portion of bandwidth, receiving a data packet in accordance with the bandwidth allocation, and the like. Further, communications apparatus 200 can include a processor that may be utilized in connection with executing instructions (e.g., instructions retained within memory, instructions obtained from a disparate source, etc.

Figure 3:
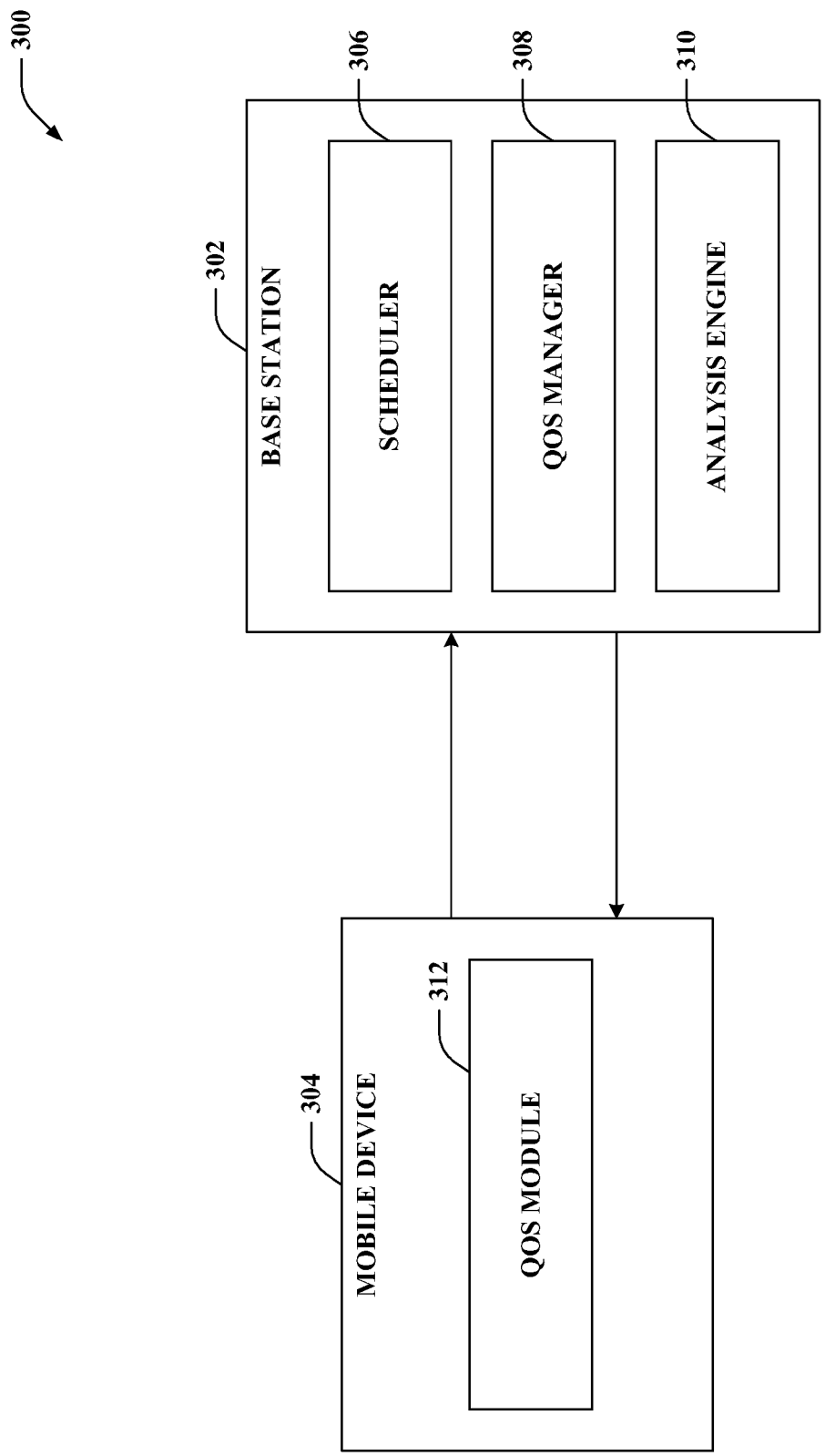
FIG. 3 is an illustration of an example wireless communications system that facilitates utilizing a scheduling policy with dynamically adjusting Quality of Service (QoS) flows.

Now referring to FIG. 3, illustrated is a wireless communications system 300 that utilizes a scheduling policy with dynamically adjusting Quality of Service (QoS) flows. The system 300 includes a base station 302 that communicates with a mobile device 304 (and/or any number of disparate mobile devices (not shown)). Base station 302 can transmit information to mobile device 304 over a forward link channel; further base station 302 can receive information from mobile device 304 over a reverse link channel. Moreover, system 300 can be a MIMO system. Additionally, the system 300 can operate in an OFDMA wireless network, a 3GPP LTE wireless network, etc. Also, the components and functionalities shown and described below in the base station 302 can be present in the mobile device 304 as well and vice versa, in one example; the configuration depicted excludes these components for ease of explanation.

Base station 302 includes a scheduler 306 that can allocate bandwidth to flows, a QoS manager 308 that can adjust an amount of bandwidth related to flows, and an analysis engine 310 that can dynamically ascertain bandwidth assignment adjustments in accordance with a metric (described in more detail below). In general, the analysis engine 310 can leverage a weight metric in order to enable the QoS manager 308 to dynamically and automatically adjust the bandwidth assignment for a combination of best effort flows and delay sensitive flows. The scheduler 306 can provide any suitable data related to the data communication between the base station 302 and the mobile device 304 as well as utilize the bandwidth allocation provided in terms of the weight metric to communication flows. Mobile device 304 includes a QoS module 312 that can receive transmitted data in accordance with the bandwidth assignments as well as provide any suitable data (e.g., data requests, best effort flows, delay sensitive flows, etc.) to the base station 302.

According to an example, the base station 302 can maintain synchronization with mobile device 304 and other mobile devices (not shown). In evolved UMTS terrestrial radio access (E-UTRA), transmission among mobile devices such as mobile device 304 or transmission between the mobile device 304 and base station 302 require alignment in time. Alignment in time facilitates maintaining orthogonality between mobile devices and reduces interference. Mobile devices, such as mobile device 304, can move about within a cell or sector serviced by the base station 302. Changes in distances between the mobile device 304 and the base station 302 can require an update in uplink timing of mobile device 304 to maintain orthogonality. Pursuant to an illustration, a mobile device moving toward or away from a base station at 350 kilometers per hour can create a change in uplink timing synchronization at a rate of 0.6 microseconds per second. In addition to pure distance changes, propagation conditions can change between a mobile device and base station due to relative movement.

Typically, a base station can employ a per-need mechanism or a periodic mechanism to maintain synchronization. With the per-need mechanism, the base station transmits timing adjustment to mobile devices when the base station determines an adjustment is required. With the periodic mechanism, the base station periodically sends adjustment to all active mobile devices. Active mobile devices include mobile devices actively sending data. It is to be appreciated that active mobile devices can also be mobile devices that are not quite active (e.g., sleeping or otherwise not sending data but retaining access to the system).

The system 300 can employ a scheduling algorithm that can exploit multi-user diversity in which the minimum amount of bandwidth resources can be utilized to satisfy the delay requirements of delay sensitive flows (e.g., delay QoS flows, etc.) and the remaining bandwidth can be applied to maximize the rates of best effort flows. Moreover, the scheduling algorithm can maintain fairness between best effort flows. The following can be utilized to partition resources between a mix of flows: associate with each BE flow i, a concave increasing utility function $U(r_i)$, where $r_i$ is the average rate seen by flow i; the average computation to get $r_i$ can be implemented as a standard exponential filter; for each delay QoS flow i, the function $f(D_i, q_i)$ can be associated where f is a monotonic increasing function in both arguments; $D_i$ and $q_i$ can denote the head-of-line delay and queue length of flow i respectively; and let $K_i$ denote the spectral efficiency that flow i can achieve; each amount of resource in the time-frequency domains (e.g., a tile in the UMB system) can be allocated to flow i if flow i has the highest metric, where the metric is giving by: $K_i U'(r_i)$ if the flow is a BE flow; and $W_i K_i f(D_i, q_i)$ if the flow is a delay QoS flow. It is to be appreciated that any suitable metric based on average rate and spectral effect can be implemented.

The weights $W_i$'s of the delay flows can be updated as follows: if flow i's delay target is met, $W_i$ is decremented, else, $W_i$ is incremented. The system 300 can maintain optimal fairness between BE flows. Moreover, a function f can be a product of positive powers of its arguments, which enables the delay QoS flows to not grow without bound for any given positive weights $W_i$'s. The delay requirements of the QoS flows can be met, the weights can converge, and the total throughput of the BE flows (subject to fairness) can be much higher than a strict priority scheme (e.g., where the delay QoS flows are given higher priority than BE flows irrespective of the spectral efficiencies, average rates, queue lengths, and head-of-line delays of the different flows).

Moreover, although not shown, it is to be appreciated that mobile device 304 can include memory that retains instructions with respect to receiving at least one of a delay sensitive flow with a delay requirement or a best effort flow, allocating a first portion of bandwidth to the delay sensitive flow, allocating a second portion of bandwidth to the best effort flow, reallocating the first amount of bandwidth to a reduced level of bandwidth and the second portion of bandwidth to an increased level of bandwidth if the delay requirement is met, reallocating the first amount of bandwidth to an increased level of bandwidth and the second portion of bandwidth to a reduced level of bandwidth if the delay requirement is not met, maintaining a level of bandwidth for the first amount of bandwidth and the second amount of bandwidth if the delay requirement is equivalent to the first portion of bandwidth, transmitting a data packet in accordance with the bandwidth allocation, and the like. Further, mobile device 304 can include a processor that may be utilized in connection with executing instructions (e.g., instructions retained within memory, instructions obtained from a disparate source, . . . ).

Figure 4:
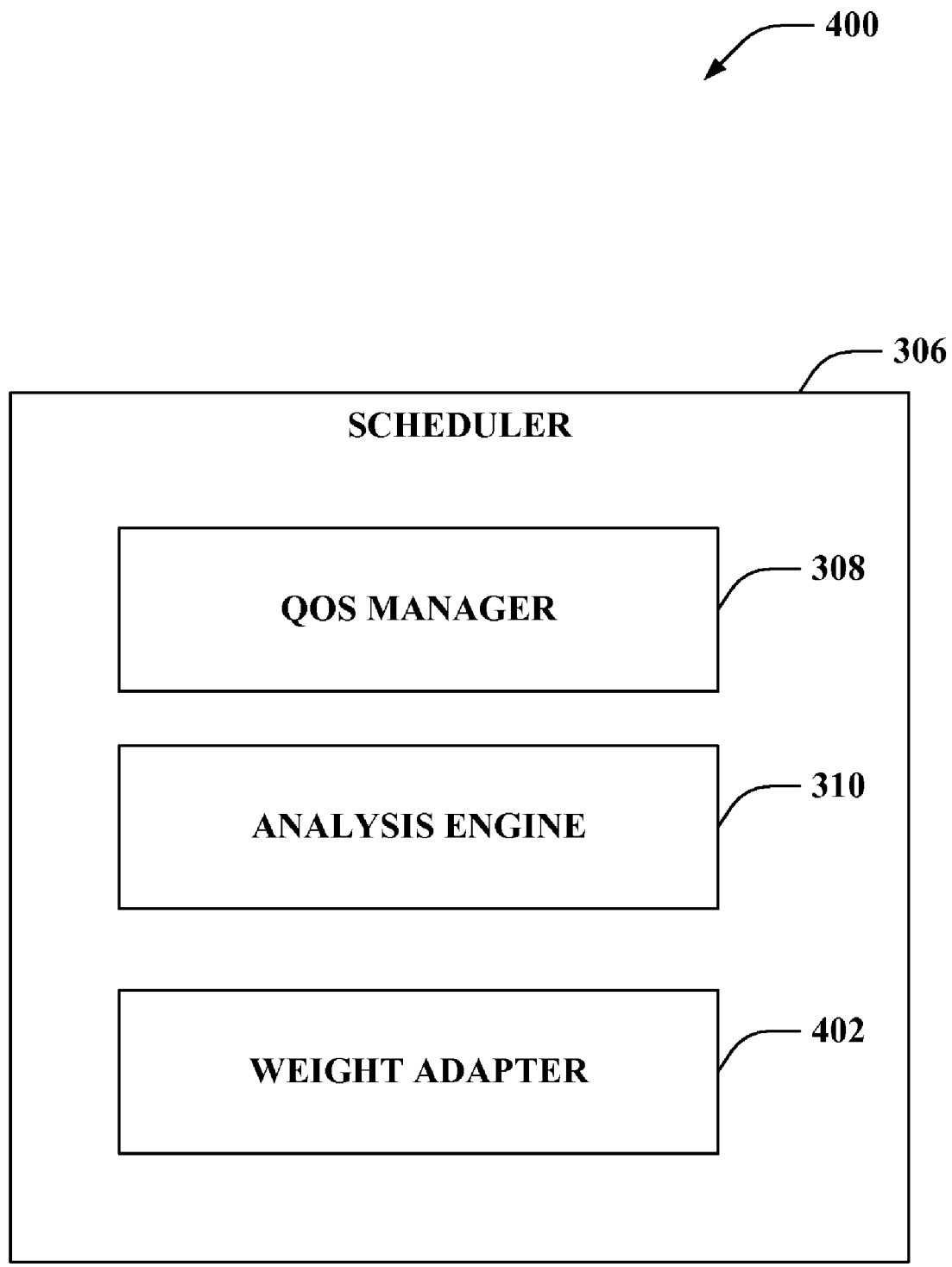
FIG. 4 is an illustration of an example system that automatically allocates bandwidth for a best effort (BE) flow and a delay sensitive flow for each packet.

Now referring to FIG. 4, an example wireless communications system 400 is illustrated according to one or more aspects of the subject disclosure. The system 400 can comprise an access point or base station (not shown) that receives, transmits, repeats, etc., wireless communication signals to other base stations (not shown) or to one or more terminals such as terminals. The base station can comprise multiple transmitter chains and receiver chains, e.g. one for each transmit and receive antenna, each of which can in turn comprise a plurality of components associated with signal transmission and reception (e.g., processors, modulators, multiplexers, demodulators, demultiplexers, antennas, etc.). The mobile devices can be, for example, cellular phones, smart phones, laptops, handheld communication devices, handheld computing devices, satellite radios, global positioning systems, PDAs, and/or any other suitable device for communicating over wireless system 400. In addition, the mobile devices can comprise one or more transmitter chains and a receiver chains, such as used for a multiple input multiple output (MIMO) system. Each transmitter and receiver chain can comprise a plurality of components associated with signal transmission and reception (e.g., processors, modulators, multiplexers, demodulators, demultiplexers, antennas, etc.), as will be appreciated by one skilled in the art.

As illustrated in FIG. 4, the system 400 can facilitate automatically allocating bandwidth for a best effort (BE) flow and a delay sensitive flow for each packet. The system 400 can include the scheduler 306 that enables allocating bandwidth for flows and adjusting such allocation based upon satisfying delay requirements associated with delay sensitive flows. The scheduler 306 can include the analysis engine 310 that can ascertain a metric that can be utilized to assign bandwidth to flows. In other words, the analysis engine 310 can calculate scheduling priorities related to combination of flows such as a best effort flow and a delay sensitive flow. Upon calculation, the QoS manager 308 can employ such priorities and/or adjust such bandwidth allocation in accordance with such metric.

To schedule a mix of delay-sensitive and best effort elastic flows, a metric can be employed to compare the priorities of serving the packet of each kind of flow. A weight W can be utilized to relate the priorities of the two classes (e.g., best effort flows, delay sensitive flows, etc.). In particular, the priority of serving a delay sensitive flow can be $Wf_i(q_i(t), d_i(t), K_i^j(t))$, while that of serving a best-effort flow can be the marginal utility of the flow relative to the amount of bandwidth allocated therewith. It is to be appreciated that $d_i(t)$ can be the head-of-line delay for a flow, $q_i(t)$ can be the buffer size (e.g., the sum of the number of bytes that are caches for a give flow and the estimated overheads/headers), and $K_i^j(t)$ can be the spectral efficiency. It is to be appreciated that these are examples of priority metrics. For instance, for best effort flows, a priority increases as average rate decreases and increases as the channel condition improves. Thus, it is to be appreciated that marginal utility relates to the amount of bandwidth.

When there is a mix of best effort flows and delay-sensitive flows, the number of resource blocks (RBs) allocated to each kind of flow can be determined (explicitly or implicitly). Given the number of RBs for each of the two categories, the distribution of RBs within each category can be determined using the above scheduling policies.

To determine the distribution across bandwidth between best effort and delay sensitive flows (e.g., delay QoS flows), fundamentally, a metric can be used to relate the best effort flow priority function to the delay QoS flow priority function such as a weight W. In particular, corresponding to the two flavors of scheduling policies for delay sensitive flows, the following algorithms can be employed to schedule a mix of flows.

For example, the distribution between flows can be related to at least one of a single sub-band and/or a multiple sub-band. For example, where bandwidth is distributed among the delay sensitive flows using the function g, the following optimization problem can be solved:

$$\max. \sum_{i=1}^{n} U_i((1-\tau\alpha_i)x_i(t) + \tau\alpha_i K_i(t)b_i) - W \sum_{i=1}^{n} c_i g(q_i(t) - b_i K_i(t))$$

$$\text{s.t.} \sum_{i=1}^{n} b_i = B, b_i \geq 0, i = 1, \ldots, n$$

$$K_i(t)b_i \leq q_i(t), i = 1, \ldots, n$$

For example, the above optimization problem can be solved using the bisection search algorithm.

For the burst-size based scheduling for delay sensitive flows, the following nested bisection search algorithm can be utilized:
1. Initialization: $B^{min}=0$, $B^{max}=B$
2. Set $B^{BE}=(B^{max}+B^{min})/2$, $B^{QoS}=B-B^{BE}$
3. Compute optimal distribution of spectral resources $B^{BE}$ among best effort flows and $B^{QoS}$ among delay sensitive flows using the burst size algorithm.
4. Post-allocation, compute $x=W \max\{f_i(q_i(t), d_i(t), K_i^j(t))): i \text{ is QoS}\}$, and the largest and second-largest $K_i(t)U'_i((1-\tau\alpha_i)x_i(t)+\tau\alpha_i K_i)(t) b_i)$, denoted by y and z, respectively.

If $y \leq x \leq z$ or $B^{max} - B^{min} < \delta$ ($\delta$ is tolerance)
   Stop.
Else if $x > y$
   $B^{max} = B^{BE}$, and Go to 2
Else
   $B^{min} = B^{BE}$, and Go to 2.

The scheduler 306 can further include a weight adapter 402. The weight adapter 402 can adapt weight on a slow time-scale such that the delay requirements of the delay sensitive flows (e.g., the delay sensitive QoS flow) are met. For example, an outer loop substantially similar to a power control outer loop can be employed. Such an adaptation can allocate the remaining spectral resources to the best effort flows and make use of multi-user diversity.

Figure 5:
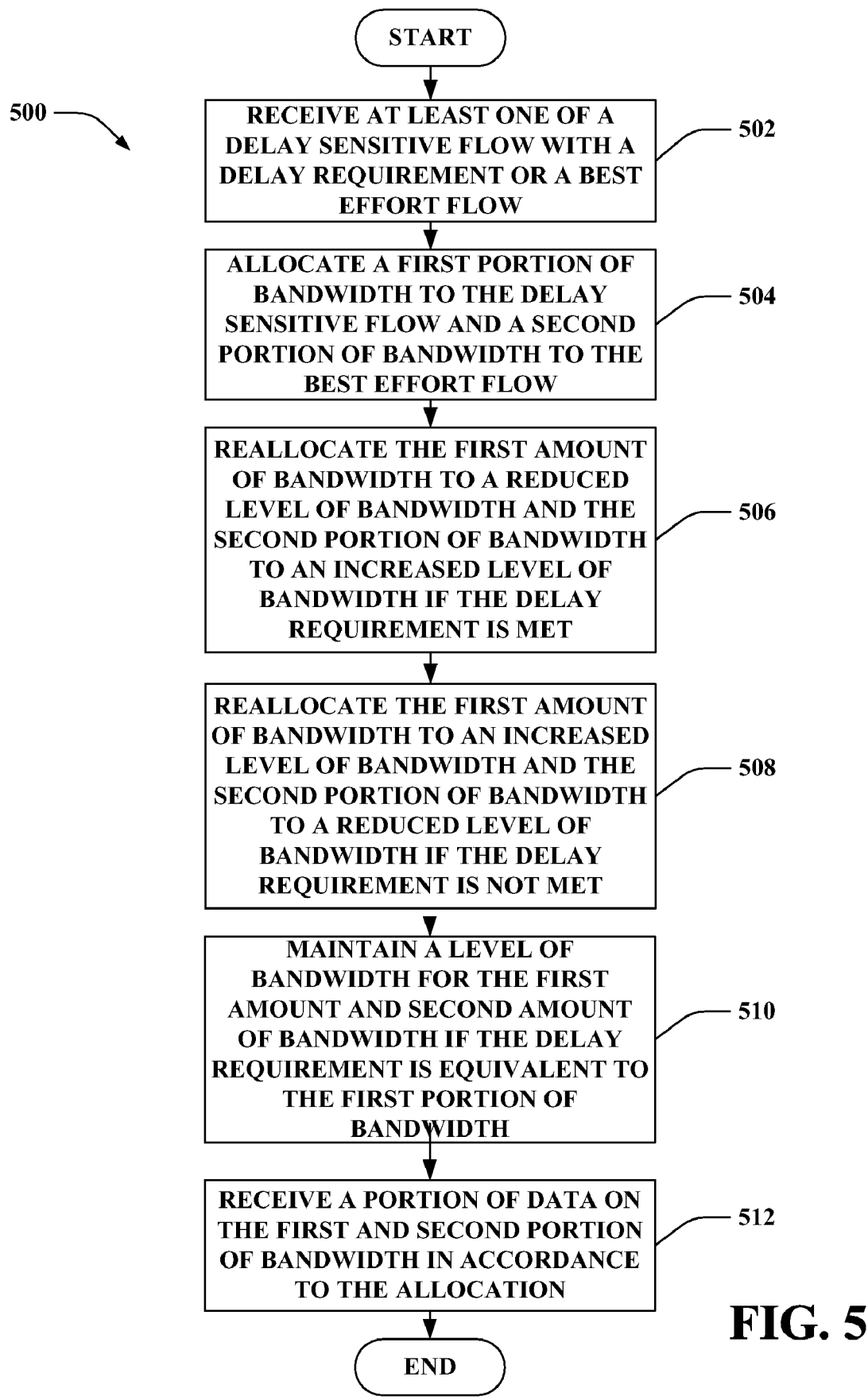
FIG. 5 is an illustration of an example methodology that efficiently assigns bandwidth to receive at least one data packet in relation to best effort (BE) flows and delay sensitive flows.
Figure 6:
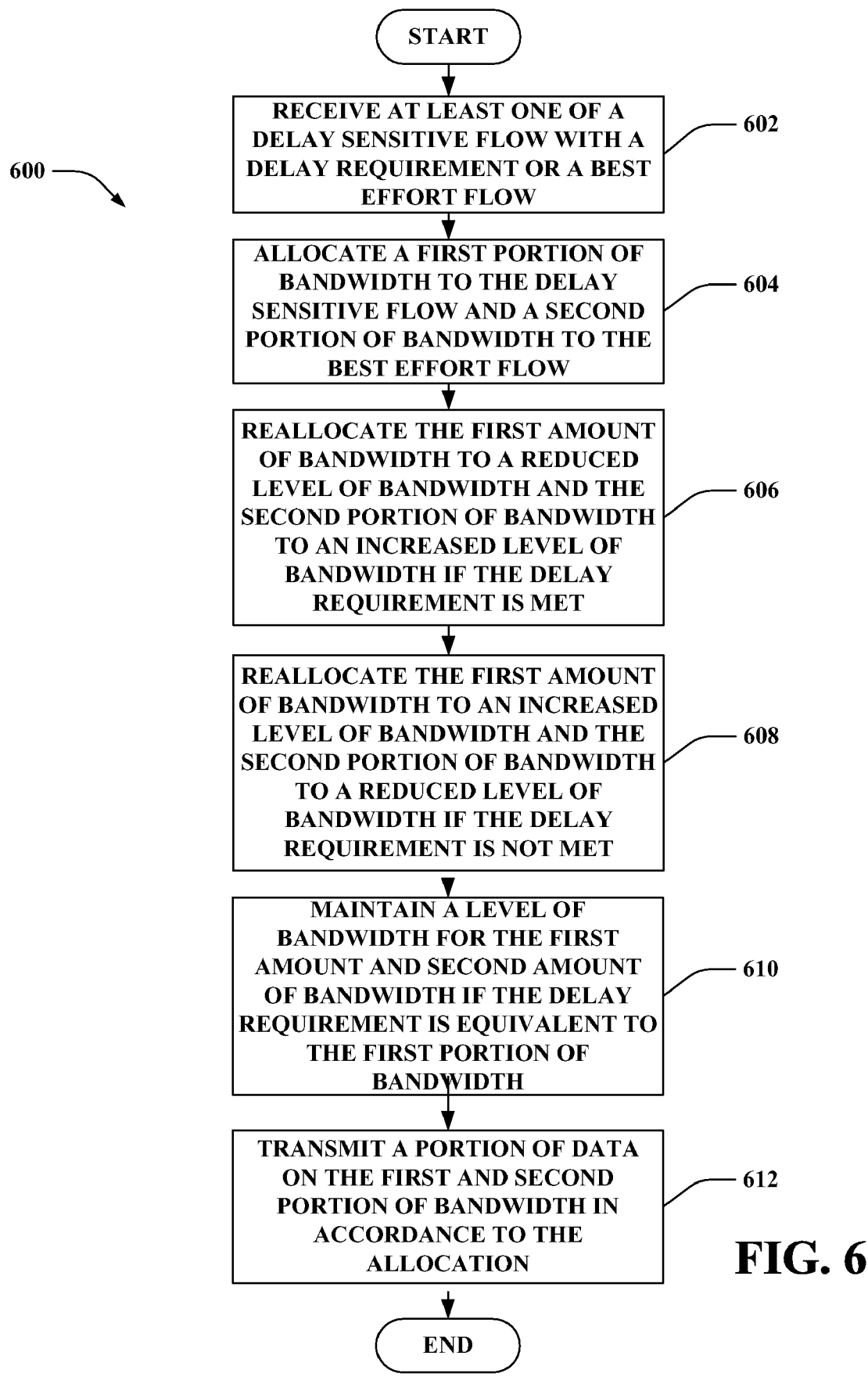
FIG. 6 is an illustration of an example methodology that optimally allocates bandwidth to transmit at least one data packet in relation to best effort (BE) flows and delay sensitive flows.

Referring to FIGS. 5-6, methodologies relating to providing uplink timing control while reducing overhead and power consumption are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning to FIG. 5, illustrated is a methodology 500 that facilitates efficiently assigning bandwidth to receive at least one data packet in relation to best effort (BE) flows and delay sensitive flows. At reference numeral 502, at least one of a delay sensitive flow with a delay requirement or a best effort flow can be received. At reference numeral 504, a first portion of bandwidth can be allocated to the delay sensitive flow, and a second portion of bandwidth can be allocated to the best effort flow. At reference numeral 506, the first amount of bandwidth can be reallocated to a reduced level of bandwidth and the second portion of bandwidth to an increased level of bandwidth if the delay requirement is met. At reference numeral 508, the first amount of bandwidth can be reallocated to an increased level of bandwidth and the second portion of bandwidth to a reduced level of bandwidth if the delay requirement is not met. At reference numeral 510, a level of bandwidth for the first amount of bandwidth can be maintained and the second amount of bandwidth can be maintained if the delay requirement is equivalent to the first portion of bandwidth. At reference numeral 512, a portion of data on the first and the second portion of bandwidth can be received in accordance with the allocation.

Now referring to FIG. 6, illustrated is a methodology 600 that optimally allocates bandwidth to transmit at least one data packet in relation to best effort (BE) flows and delay sensitive flows. At reference numeral 602, at least one of a delay sensitive flow with a delay requirement or a best effort flow can be received. At reference numeral 604, a first portion of bandwidth can be allocated to the delay sensitive flow, and a second portion of bandwidth can be allocated to the best effort flow. At reference numeral 606, the first amount of bandwidth can be reallocated to a reduced level of bandwidth and the second portion of bandwidth to an increased level of bandwidth if the delay requirement is met. At reference numeral 608, the first amount of bandwidth can be reallocated to an increased level of bandwidth and the second portion of bandwidth to a reduced level of bandwidth if the delay requirement is not met. At reference numeral 610, a level of bandwidth for the first amount of bandwidth can be maintained and the second amount of bandwidth can be maintained if the delay requirement is equivalent to the first portion of bandwidth. At reference numeral 612, a portion of data on the first and the second portion of bandwidth can be transmitted in accordance with the allocation.

Figure 7:
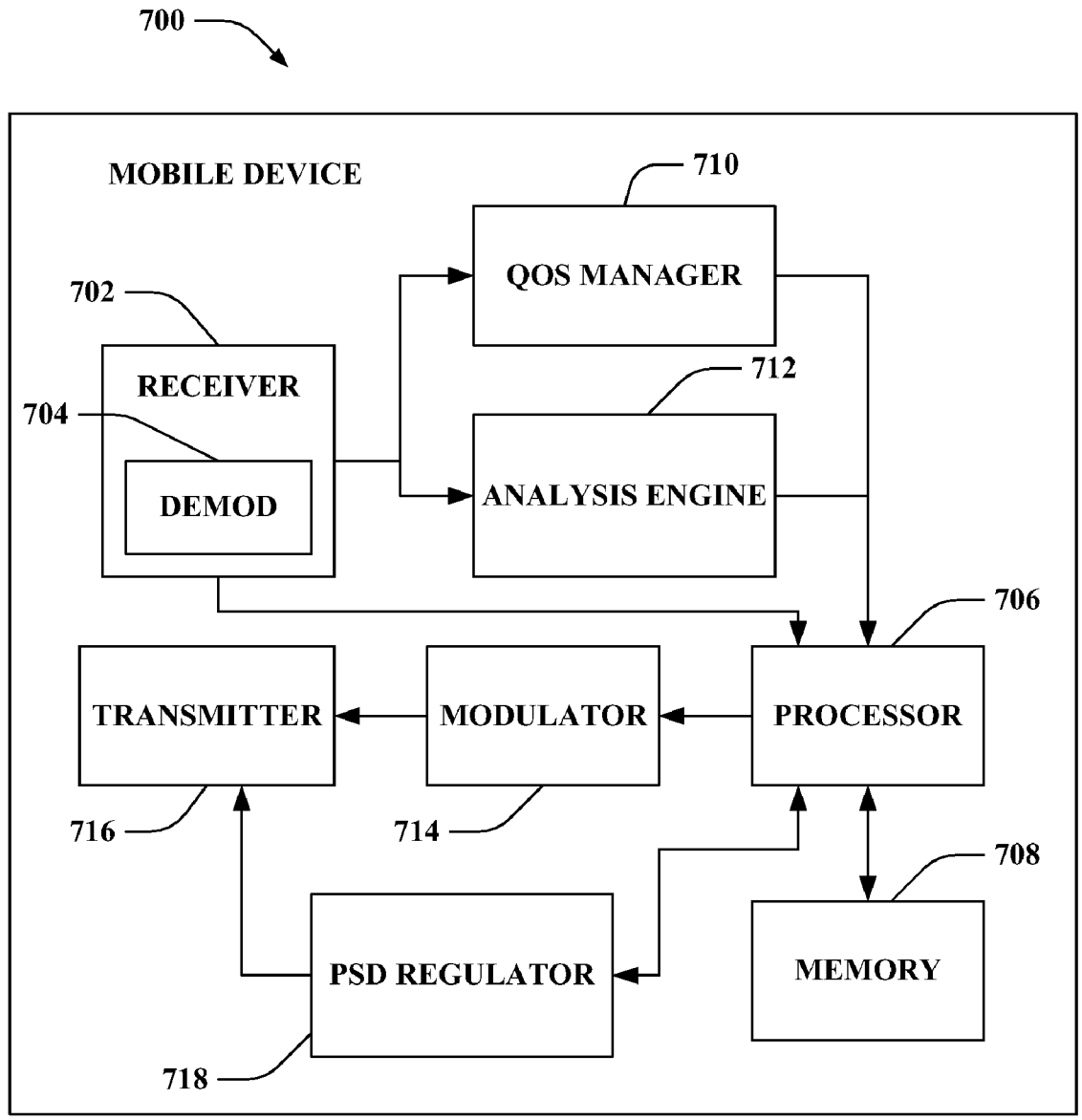
FIG. 7 is an illustration of an example mobile device that facilitates receiving best effort (BE) flows and/or delay sensitive flows with efficiently allocated bandwidth to such flows in a wireless communication system.

FIG. 7 is an illustration of a mobile device 700 that facilitates receiving best effort (BE) flows and/or delay sensitive flows with efficiently allocated bandwidth to such flows in a wireless communication system. Mobile device 700 comprises a receiver 702 that receives a signal from, for instance, a receive antenna (not shown), performs typical actions on (e.g., filters, amplifies, downconverts, etc.) the received signal, and digitizes the conditioned signal to obtain samples. Receiver 702 can comprise a demodulator 704 that can demodulate received symbols and provide them to a processor 706 for channel estimation. Processor 706 can be a processor dedicated to analyzing information received by receiver 702 and/or generating information for transmission by a transmitter 716, a processor that controls one or more components of mobile device 700, and/or a processor that both analyzes information received by receiver 702, generates information for transmission by transmitter 716, and controls one or more components of mobile device 700.

Mobile device 700 can additionally comprise memory 708 that is operatively coupled to processor 706 and that can store data to be transmitted, received data, information related to available channels, data associated with analyzed signal and/or interference strength, information related to an assigned channel, power, rate, or the like, and any other suitable information for estimating a channel and communicating via the channel. Memory 708 can additionally store protocols and/or algorithms associated with estimating and/or utilizing a channel (e.g., performance based, capacity based, etc.).

It will be appreciated that the data store (e.g., memory 708) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 708 of the subject systems and methods is intended to comprise, without being limited to, these and any other suitable types of memory.

Processor 706 can further be operatively coupled to QoS manager 710 that employs priority scheduling of flows in accordance with a metric ascertained by an analysis engine 712 as described supra, for instance. Pursuant to an illustration, the analysis engine 712 can determine bandwidth assignment to a combination of delay sensitive flows with delay requirements and best effort flows. For example, the analysis engine can dynamically calculate whether or not the delay requirement for delay sensitive flows are being met based upon a metric. The QoS manager 710 can adjust the bandwidth allocation accordingly (e.g., based upon the metric) in order to ensure the delay requirements are met for delay sensitive flows and assigning any remaining bandwidth to the best effort flows. In other words, the QoS manager 710 and the analysis engine 712 can effectively and optimally prioritize scheduling policies in regards to flows for the mobile device 700. Additionally, the mobile device 700 can receive data packets based at least in part upon the scheduling priorities identified by the QoS manager 710 and/or the analysis engine 712.

Mobile device 700 still further comprises a modulator 714 and transmitter 716 that respectively modulate and transmit signals to, for instance, a base station, another mobile device, etc. Although depicted as being separate from the processor 706, it is to be appreciated that the QoS manager 710, analysis engine 712, demodulator 704, and/or modulator 714 can be part of the processor 706 or multiple processors (not shown).

Figure 8:
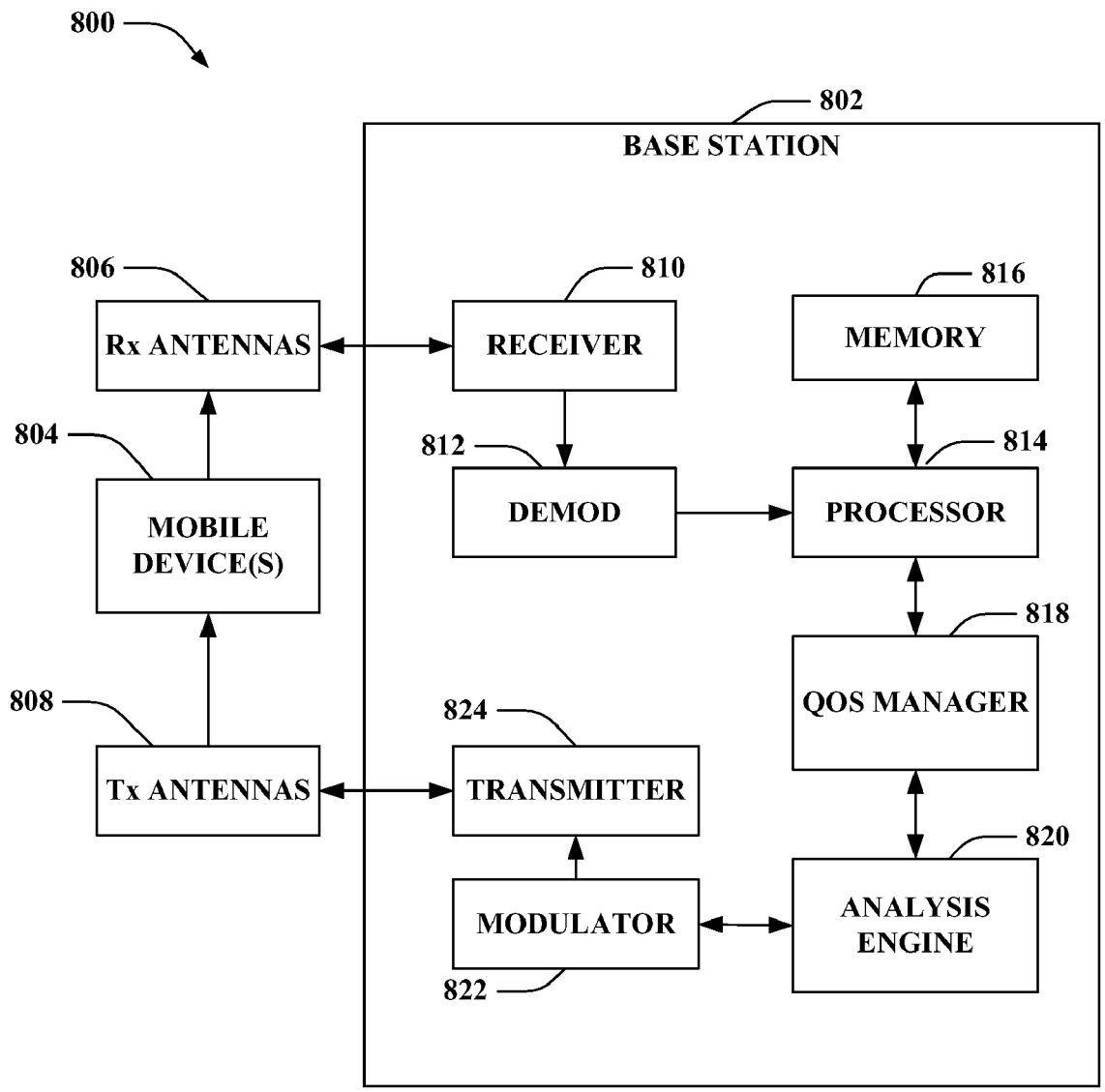
FIG. 8 is an illustration of an example system that facilitates managing quality of service (QoS) for best effort flows and delay sensitive flows in a wireless communication environment.

FIG. 8 is an illustration of a system 800 that facilitates managing quality of service (QoS) for best effort flows and delay sensitive flows in a wireless communication environment as described supra. The system 800 comprises a base station 802 (e.g., access point) with a receiver 810 that receives signal(s) from one or more mobile devices 804 through a plurality of receive antennas 806, and a transmitter 824 that transmits to the one or more mobile devices 804 through a transmit antenna 808. Receiver 810 can receive information from receive antennas 806 and is operatively associated with a demodulator 812 that demodulates received information. Demodulated symbols are analyzed by a processor 814 that can be similar to the processor described above with regard to FIG. 7, and which is coupled to a memory 816 that stores information related to estimating a signal (e.g., pilot) strength and/or interference strength, data to be transmitted to or received from mobile device(s) 804 (or a disparate base station (not shown)), and/or any other suitable information related to performing the various actions and functions set forth herein. Processor 814 is further coupled to a QoS manager 818 that can implement scheduling priorities in regards to flows for mobile devices 804 in which best effort flows and delay sensitive flows are transmitted with bandwidth assignments determined from a calculated metric. Moreover, the processor 814 can be coupled to an analysis engine 820 that can dynamically ascertain the metric in order to transmit data packets to the mobile device 804 according to such calculated metric which dictates bandwidth assignments for a combination of delay sensitive flows and best effort flows.

Furthermore, although depicted as being separate from the processor 814, it is to be appreciated that the QoS manager 818, analysis engine 820, demodulator 812, and/or modulator 822 can be part of the processor 814 or multiple processors (not shown).

FIG. 8 is an illustration of a system 800 that facilitates managing quality of service (QoS) for best effort flows and delay sensitive flows in a wireless communication environment as described supra. The system 800 comprises a base station 802 (e.g., access point, . . . ) with a receiver 810 that receives signal(s) from one or more mobile devices 804 through a plurality of receive antennas 806, and a transmitter 824 that transmits to the one or more mobile devices 804 through a transmit antenna 808. Receiver 810 can receive information from receive antennas 806 and is operatively associated with a demodulator 812 that demodulates received information. Demodulated symbols are analyzed by a processor 814 that can be similar to the processor described above with regard to FIG. 7, and which is coupled to a memory 816 that stores information related to estimating a signal (e.g., pilot) strength and/or interference strength, data to be transmitted to or received from mobile device(s) 804 (or a disparate base station (not shown)), and/or any other suitable information related to performing the various actions and functions set forth herein. Processor 814 is further coupled to a QOS manager 818 that can implement scheduling priorities in regards to flows for mobile devices 804 in which best effort flows and delay sensitive flows are transmitted with bandwidth assignments determined from a calculated metric. Moreover, the processor 814 can be coupled to an analysis engine 820 that can dynamically ascertain the metric in order to transmit data packets to the mobile device 804 according to such calculated metric which dictates bandwidth assignments for a combination of delay sensitive flows and best effort flows.

Furthermore, although depicted as being separate from the processor 814, it is to be appreciated that the QOS manager 818, analysis engine 820, demodulator 812, and/or modulator 822 can be part of the processor 814 or multiple processors (not shown).

Figure 9:
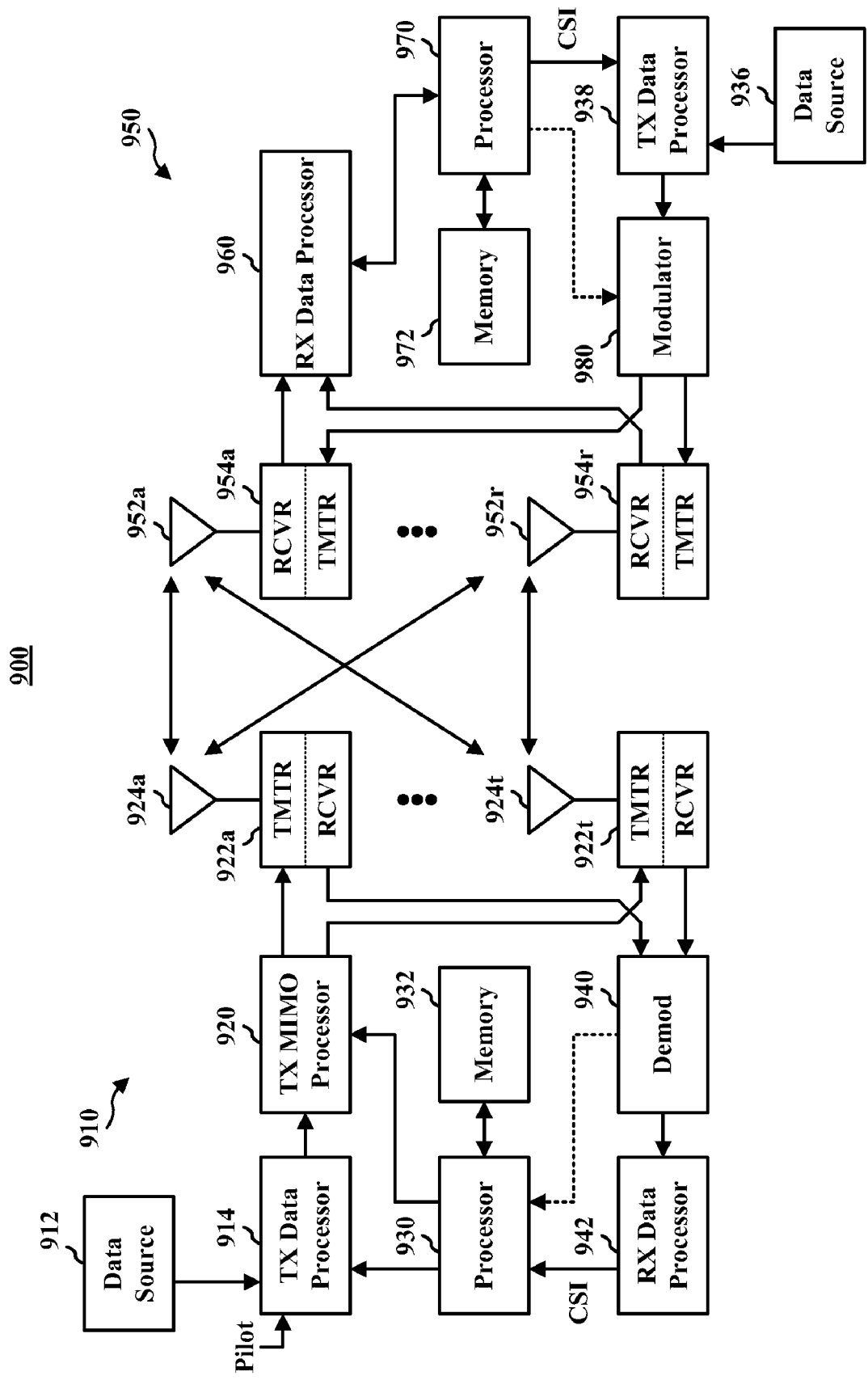
FIG. 9 is an illustration of an example wireless network environment that can be employed in conjunction with the various systems and methods described herein.

FIG. 9 shows an example wireless communication system 900. The wireless communication system 900 depicts one base station 910 and one mobile device 950 for sake of brevity. However, it is to be appreciated that system 900 can include more than one base station and/or more than one mobile device, wherein additional base stations and/or mobile devices can be substantially similar or different from example base station 910 and mobile device 950 described below. In addition, it is to be appreciated that base station 910 and/or mobile device 950 can employ the systems (FIGS. 1-4 and 7-8) and/or methods (FIGS. 5-6) described herein to facilitate wireless communication there between.

At base station 910, traffic data for a number of data streams is provided from a data source 912 to a transmit (TX) data processor 914. According to an example, each data stream can be transmitted over a respective antenna. TX data processor 914 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 950 to estimate channel response. The multiplexed pilot and coded data for each data stream can be modulated (e.g. symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 930.

The modulation symbols for the data streams can be provided to a TX MIMO processor 920, which can further process the modulation symbols (e.g., for OFDM). TX MIMO processor 920 then provides $N_T$ modulation symbol streams to $N_T$ transmitters (TMTR) 922a through 922t. In various embodiments, TX MIMO processor 920 applies beamforming weights to the symbols of the data streams and to the antenna from which the symbol is being transmitted.

Each transmitter 922 receives and processes a respective symbol stream to provide one or more analog signals, and further conditions (e.g. amplifies, filters, and upconverts) the analog signals to provide a modulated signal suitable for transmission over the MIMO channel. Further, $N_T$ modulated signals from transmitters 922a through 922t are transmitted from $N_T$ antennas 924a through 924t, respectively.

At mobile device 950, the transmitted modulated signals are received by $N_R$ antennas 952a through 952r and the received signal from each antenna 952 is provided to a respective receiver (RCVR) 954a through 954r. Each receiver 954 conditions (e.g., filters, amplifies, and downconverts) a respective signal, digitizes the conditioned signal to provide samples, and further processes the samples to provide a corresponding "received" symbol stream.

An RX data processor 960 can receive and process the $N_R$ received symbol streams from $N_R$ receivers 954 based on a particular receiver processing technique to provide $N_T$ "detected" symbol streams. RX data processor 960 can demodulate, deinterleave, and decode each detected symbol stream to recover the traffic data for the data stream. The processing by RX data processor 960 is complementary to that performed by TX MIMO processor 920 and TX data processor 914 at base station 910.

A processor 970 can periodically determine which precoding matrix to utilize as discussed above. Further, processor 970 can formulate a reverse link message comprising a matrix index portion and a rank value portion.

The reverse link message can comprise various types of information regarding the communication link and/or the received data stream. The reverse link message can be processed by a TX data processor 938, which also receives traffic data for a number of data streams from a data source 936, modulated by a modulator 980, conditioned by transmitters 954a through 954r, and transmitted back to base station 910.

At base station 910, the modulated signals from mobile device 950 are received by antennas 924, conditioned by receivers 922, demodulated by a demodulator 940, and processed by a RX data processor 942 to extract the reverse link message transmitted by mobile device 950. Further, processor 930 can process the extracted message to determine which preceding matrix to use for determining the beamforming weights.

Processors 930 and 970 can direct (e.g. control, coordinate, manage, etc.) operation at base station 910 and mobile device 950, respectively. Respective processors 930 and 970 can be associated with memory 932 and 972 that store program codes and data. Processors 930 and 970 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 10:
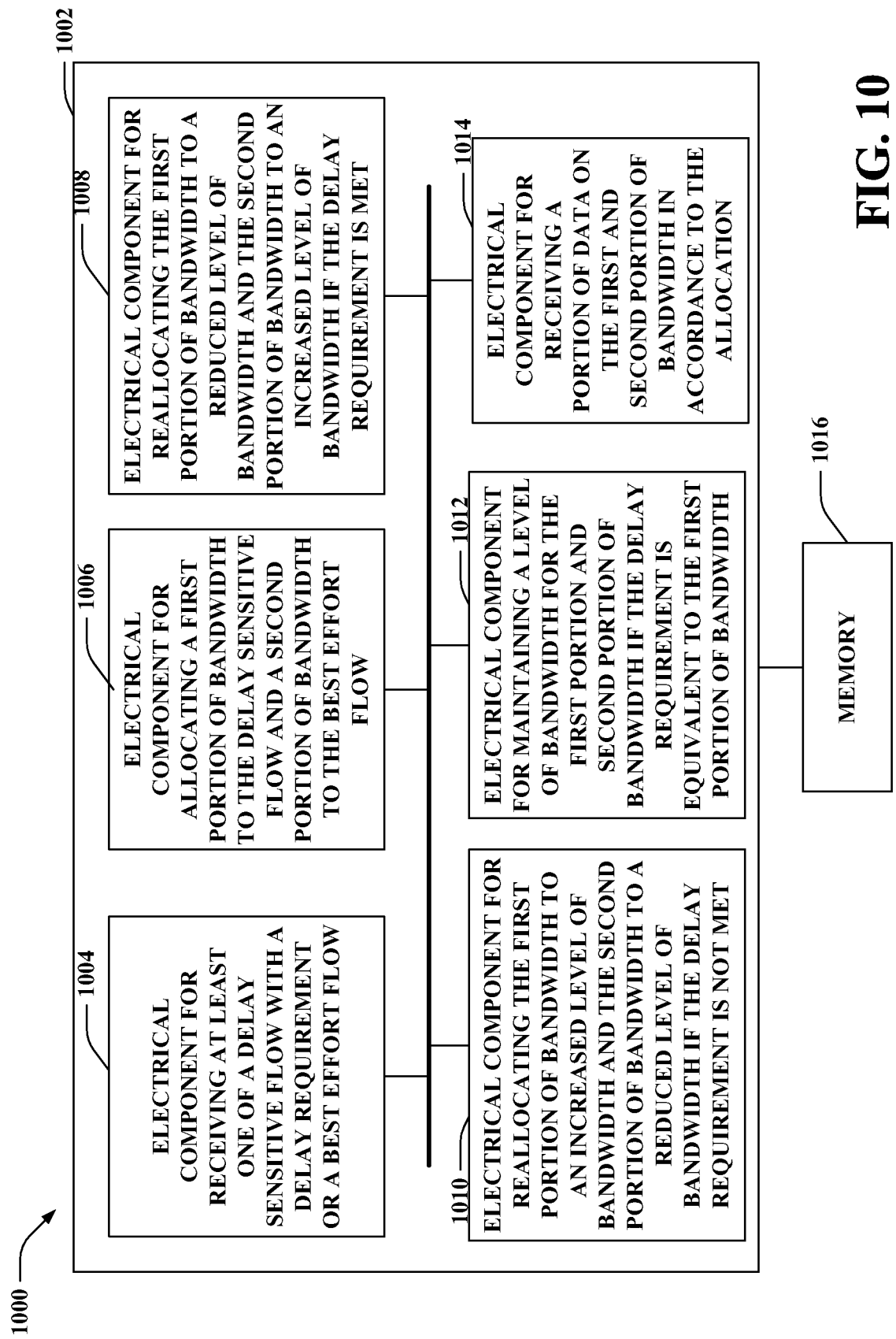
FIG. 10 is an illustration of an example system that efficiently assigns bandwidth to receive at least one data packet in relation to best effort (BE) flows and delay sensitive flows.

With reference to FIG. 10, illustrated is a system 1000 that efficiently assigns bandwidth to receive at least one data packet in relation to best effort (BE) flows and delay sensitive flows. For example, system 1000 can reside at least partially within a base station, mobile device, etc. It is to be appreciated that system 1000 is represented as including functional blocks, which can be functional blocks that represent functions implemented by a processor, software, or combination thereof (e.g., firmware). System 1000 includes a logical grouping 1002 of electrical components that can act in conjunction. The logical grouping 1002 can include an electrical component for receiving at least one of a delay sensitive flow with a delay requirement or a best effort flow 1004. In addition, the logical grouping 1002 can comprise an electrical component for allocating a first portion of bandwidth to the delay sensitive flow and a second portion of bandwidth to the best effort flow 1006. Moreover, the logical grouping 1002 can include an electrical component for reallocating the first portion of bandwidth to a reduced level of bandwidth and the second portion of bandwidth to an increased level of bandwidth if the delay requirement is met 1008. In addition, the logical grouping 1002 can comprise an electrical component for reallocating the first portion of bandwidth to an increased level of bandwidth and the second portion of bandwidth to a reduced level of bandwidth if the delay requirement is not met 1010. The logical grouping 1002 can comprise an electrical component for maintaining a level of bandwidth for the first portion and the second portion of bandwidth if the delay requirement is equivalent to the first portion of bandwidth 1012. The logical grouping 1002 can comprise an electrical component for receiving a portion of data on the first and second portion of bandwidth in accordance to the allocation 1014. Additionally, system 1000 can include a memory 1016 that retains instructions for executing functions associated with electrical components 1004, 1006, 1008, 1010, 1012, and 1014. While shown as being external to memory 1016, it is to be understood that one or more of electrical components 1004, 1006, 1008, 1010, 1012, and 1014 can exist within memory 1016.

Figure 11:
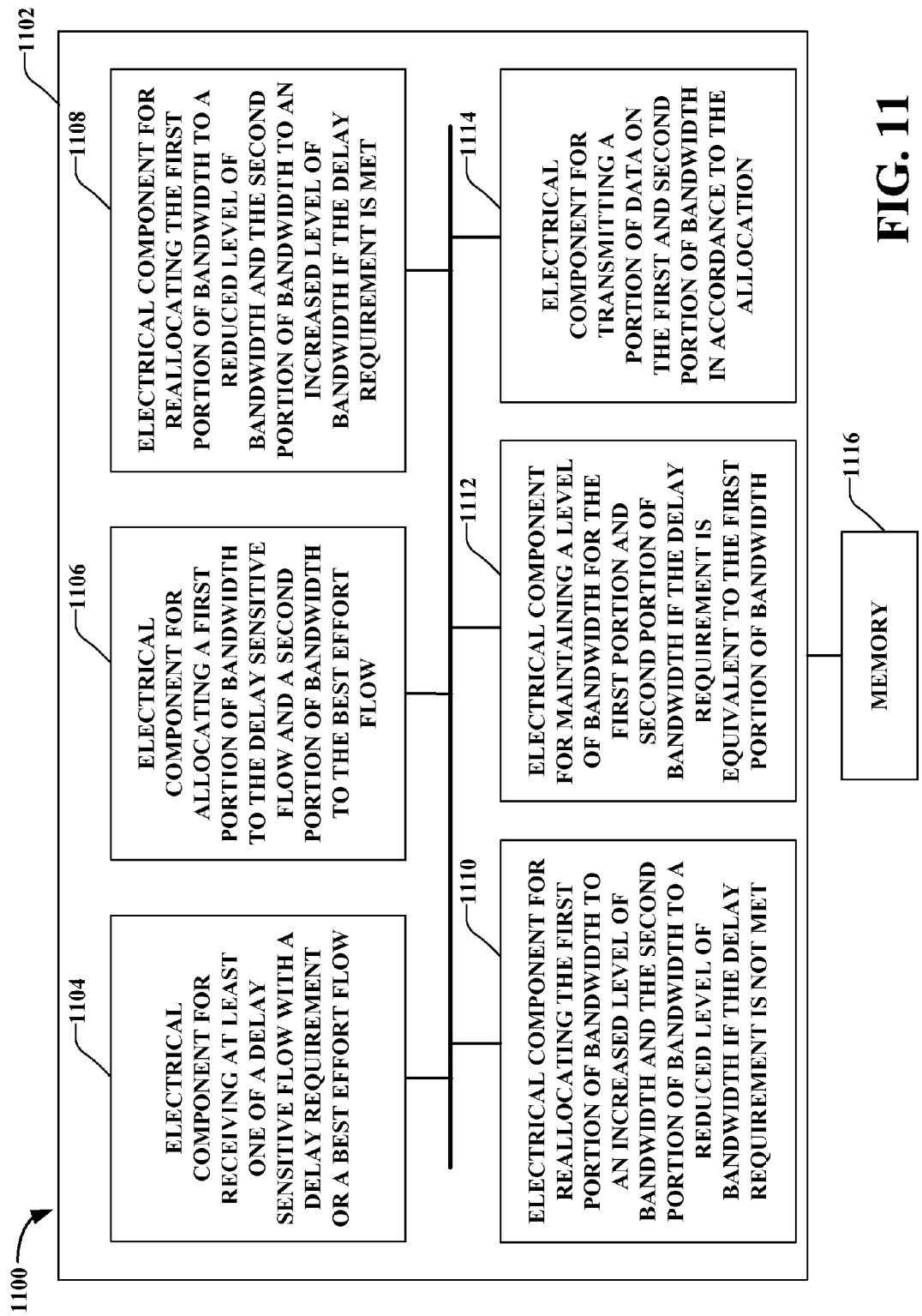
FIG. 11 is an illustration of an example system that optimally allocates bandwidth to transmit at least one data packet in relation to best effort (BE) flows and delay sensitive flows in a wireless communication environment.

Turning to FIG. 11, illustrated is a system 1100 that optimally allocates bandwidth to transmit at least one data packet in relation to best effort (BE) flows and delay sensitive flows in a wireless communication environment. System 1100 can reside within a base station, mobile device, etc., for instance. As depicted, system 1100 includes functional blocks that can represent functions implemented by a processor, software, or combination thereof (e.g., firmware). System 1100 includes a logical grouping 1102 of electrical components that facilitate scheduling of data packets. The logical grouping 1102 can include an electrical component for receiving at least one of a delay sensitive flow with a delay requirement or a best effort flow 1104. In addition, the logical grouping 1102 can comprise an electrical component for allocating a first portion of bandwidth to the delay sensitive flow and a second portion of bandwidth to the best effort flow 1106. Moreover, the logical grouping 1102 can include an electrical component for reallocating the first portion of bandwidth to a reduced level of bandwidth and the second portion of bandwidth to an increased level of bandwidth if the delay requirement is met 1108. In addition, the logical grouping 1102 can comprise an electrical component for reallocating the first portion of bandwidth to an increased level of bandwidth and the second portion of bandwidth to a reduced level of bandwidth if the delay requirement is not met 1110. The logical grouping 1102 can comprise an electrical component for maintaining a level of bandwidth for the first portion and the second portion of bandwidth if the delay requirement is equivalent to the first portion of bandwidth 1112. The logical grouping 1102 can comprise an electrical component for transmitting a portion of data on the first and second portion of bandwidth in accordance to the allocation 1114. Additionally, system 1100 can include a memory 1116 that retains instructions for executing functions associated with electrical components 1104, 1106, 1108, 1110, 1112, and 1114. While shown as being external to memory 1116, it is to be understood that one or more of electrical components 1104, 1106, 1108, 1110, 1112, and 1114 can exist within memory 1116.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that facilitates scheduling a best effort flow and a flow with a delay requirement within a wireless communications environment, comprising:
 receiving a delay sensitive flow with a delay requirement;
 receiving a best effort flow;

allocating a first portion of bandwidth to the delay sensitive flow;

allocating a second portion of bandwidth to the best effort flow;

reallocating the first portion of bandwidth to a reduced level of bandwidth and the second portion of bandwidth to an increased level of bandwidth if the delay requirement is met;

reallocating the first portion of bandwidth to an increased level of bandwidth and the second portion of bandwidth to a reduced level of bandwidth if the delay requirement is not met; and maintaining a level of bandwidth for the first portion of bandwidth and the second portion of bandwidth if the delay requirement is equivalent to the first portion of bandwidth; and wherein the reallocation of bandwidth for the first portion of bandwidth is served by Wfi(gi(t), di(t), Kji (t)), where fi is a delay sensitive flow, W is a relative weight between priorities of best effort users and priority of delay sensitive flow users, j is a sub-band index, di(t) is a head-of-line delay for a flow, the qi(t) is a buffer size, and the Kji (t) is a spectral efficiency for a flow i at a time t.

2. The method of claim 1, further comprising receiving at least one data packet in accordance with the bandwidth allocation of the first portion of bandwidth and the second portion of bandwidth.

3. The method of claim 1, further comprising transmitting at least one data packet in accordance with the bandwidth allocation of the first portion of bandwidth and the second portion of bandwidth.

4. The method of claim 1, further comprising adjusting the allocation of bandwidth for each data packet.

5. The method of claim 1, wherein the reallocation of bandwidth for the second portion of bandwidth is served by a marginal utility of the best effort flow relative to the amount of bandwidth allocated therewith.

6. The method of claim 1, further comprising utilizing a bisection search algorithm to solve the following:

$$\max. \sum_{i=1}^{n} U_i((1-\tau\alpha_i)x_i(t) + \tau\alpha_i K_i(t)b_i) - W\sum_{i=1}^{n} c_i g(q_i(t) - b_i K_i(t))$$

$$\text{s.t.} \sum_{i=1}^{n} b_i = B, b_i \geq 0, i = 1, \ldots, n$$

$$K_i(t)b_i \leq q_i(t), i = 1, \ldots, n$$

wherein $U_i(\ )$ is a utility function which measures the best effort flow as a function of an average rate at which it is served, $\tau$ is a length of one subframe, $\alpha_1$ is a weight for updating an average, $x_i$ is an average rate of a flow i, $c_i$ is a weight for a cost function for flow i, $b_i$ is a spectral resource of a flow i, $g(\ )$ is a cost function based on a queue length, and B is a spectral resource.

7. The method of claim 6, further comprising:
initializing $B^{min}=0, B^{max}=B$;
setting $B^{BE}=(B^{max}+B^{min})/2$, $B^{QoS}=B-B^{BE}$; and
computing an optimal distribution of spectral resources $B^{BE}$ among best effort flows and $B^{QoS}$ among delay sensitive flows using a burst size algorithm.

8. The method of claim 7, further comprising:
computing $x=W \max\{f_i(q_i(t), d_i(t), K_i^j(t))\}$;
computing first largest $y=K_i(t)U'_i((1-\tau\alpha_i)x_i(t)+\tau\alpha_i K_i(t)b_i)$, wherein $U'_i(\ )$ is a derivative of the utility function $U_i(\ )$;

computing a second largest $z=K_i(t)U'_i((1-\tau\alpha_i)x_i(t)+\tau\alpha_i K_i(t)b_i)$; and implementing the following:

---

If $y \leq x \leq z$ or $B^{max} - B^{min} < \delta$, where $\delta$ is tolerance
    Stop
Else if $x > y$
    $B^{max} = B^{BE}$, and set $B^{BE} = (B^{max} + B^{min})/2$, $B^{QoS} = B - B^{BE}$
Else
    $B^{min} = B^{BE}$, and set $B^{BE} = (B^{max} + B^{min})/2$, $B^{QoS} = B - B^{BE}$.

---

9. The method of claim 1, further comprising adapting the bandwidth allocation for at least one of the first portion of bandwidth or the second portion of bandwidth on a slow time scale.

10. A wireless communications apparatus, comprising:
at least one processor configured to:
receive a delay requirement associated with a delay sensitive flow;
receive a best effort flow;
allocate a first portion of bandwidth to the delay sensitive flow;
allocate a second portion of bandwidth to the best effort flow;
reallocate the first portion of bandwidth to a reduced level of bandwidth and the second portion of bandwidth to an increased level if the delay requirement is met;
reallocate the first portion of bandwidth to an increased level of bandwidth and the second portion of bandwidth to a reduced level of bandwidth if the delay requirement is not met;
maintain a level of bandwidth for the first portion of bandwidth and the second portion of bandwidth if the delay requirement is equivalent to the first portion of bandwidth;
wherein the reallocation of bandwidth for the first portion of bandwidth is served by $Wf_i(q_i(t), d_i(t), K_i^j(t))$, where $f_i$ is a delay sensitive flow, W is a relative weight between priorities of best effort users and priority of delay sensitive flow users, j is a sub-band index, $d_i(t)$ is a head-of-line delay for a flow, the $q_i(t)$ is a buffer size, and the $K_i^j(t)$ is a spectral efficiency for a flow i at a time t; and
a memory coupled to the at least one processor.

11. The wireless communications apparatus of claim 10, wherein the at least one processor is configured to receive at least one data packet in accordance with the bandwidth allocation of the first portion of bandwidth and the second portion of bandwidth.

12. The wireless communications apparatus of claim 10, wherein the at least one processor is configured to transmit at least one data packet in accordance with the bandwidth allocation of the first portion of bandwidth and the second portion of bandwidth.

13. The wireless communications apparatus of claim 10, wherein the at least one processor is configured to adjust the allocation of bandwidth for each data packet.

14. The wireless communications apparatus of claim 10, wherein the reallocation of bandwidth for the second portion of bandwidth is served by a marginal utility of the best effort flow relative to the amount of bandwidth allocated therewith.

15. The wireless communications apparatus of claim 10, wherein the at least one processor is configured to utilize a bisection search algorithm to solve the following:

$$\max. \sum_{i=1}^{n} U_i((1-\tau\alpha_i)x_i(t) + \tau\alpha_i K_i(t)b_i) - W \sum_{i=1}^{n} c_i g(q_i(t) - b_i K_i(t))$$

$$\text{s.t.} \sum_{i=1}^{n} b_i = B, b_i \geq 0, i = 1, \ldots, n$$

$$K_i(t)b_i \leq q_i(t), i = 1, \ldots, n$$

wherein $U_i(\ )$ is a utility function which measures the best effort flow as a function of an average rate at which it is served, $\tau$ is a length of one subframe, $\alpha_i$ is a weight for updating an average, $x_i$ is an average rate of a flow i, $c_i$ is a weight for a cost function for flow i, $b_i$ is a spectral resource of a flow i, $g(\ )$ is a cost function based on a queue length, and B is a spectral resource.

16. The wireless communications apparatus of claim 15, wherein the at least one processor is configured to:
initialize $B^{min}=0, B^{max}=B$;
set $B^{BE}=(B^{max}+B^{min})/2$, $B^{QoS}=B-B^{BE}$; and
compute an optimal distribution of spectral resources $B^{BE}$ among best effort flows and $B^{QoS}$ among delay sensitive flows using a burst size algorithm.

17. The wireless communications apparatus of claim 16, wherein the at least one processor is configured to:
computing $x=W \max \{f_i(q_i(t), d_i(t), K_i^j(t))\}$;
compute first largest $y=K_i(t)U'_i((1-\tau\alpha_i)x_i(t)+\tau\alpha_i K_i(t)b_i)$, wherein $U'_i(\ )$ is a derivative of the utility function $U_i(\ )$;
compute a second largest $z=K_i(t)U'_i((1-\tau\alpha_i)x_i(t)+\tau\alpha_i K_i(t)b_i)$; and
implement the following:

```
If y ≤ x ≤ z or B^max - B^min < ò, where ò is tolerance
    Stop
Else if x > y
    B^max = B^BE, and set B^BE = (B^max + B^min) / 2, B^QoS = B - B^BE
Else
    B^min = B^BE, and set B^BE = (B^max + B^min) / 2, B^QoS = B - B^BE.
```

18. The wireless communications apparatus of claim 10, wherein the at least one processor is configured to adapt the bandwidth allocation for at least one of the first portion of bandwidth or the second portion of bandwidth on a slow time scale.

19. A wireless communications apparatus that enables scheduling a best effort flow and a flow with a delay requirement in a wireless communication network, comprising:
means for receiving a delay requirement associated with a delay sensitive flow;
means for receiving a best effort flow;
means for allocating a first portion of bandwidth to the delay sensitive flow;
means for allocating a second portion of bandwidth to the best effort flow;
means for reallocating the first portion of bandwidth to a reduced level of bandwidth and the second portion of bandwidth to an increased level if the delay requirement is met;
means for reallocating the first portion of bandwidth to an increased level of bandwidth and the second portion of bandwidth to a reduced level of bandwidth if the delay requirement is not met;
means for maintaining a level of bandwidth for the first portion of bandwidth and the second portion of bandwidth if the delay requirement is equivalent to the first portion of bandwidth; and
wherein the reallocation of bandwidth for the first portion of bandwidth is served by $Wf_i(q_i(t), d_i(t), K_i^j(t))$, where $f_i$ is a delay sensitive flow, W is a relative weight between priorities of best effort users and priority of delay sensitive flow users, j is a sub-band index, $d_i(t)$ is a head-of-line delay for a flow, the $q_i(t)$ is a buffer size, and the $K_i^j(t)$ is a spectral efficiency for a flow i at a time t.

20. The wireless communications apparatus of claim 19, further comprising means for receiving at least one data packet in accordance with the bandwidth allocation of the first portion of bandwidth and the second portion of bandwidth.

21. The wireless communications apparatus of claim 19, further comprising means for transmitting at least one data packet in accordance with the bandwidth allocation of the first portion of bandwidth and the second portion of bandwidth.

22. The wireless communications apparatus of claim 19, further comprising means for adjusting the allocation of bandwidth for each data packet.

23. The wireless communications apparatus of claim 19, wherein the reallocation of bandwidth for the second portion of bandwidth is served by a marginal utility of the best effort flow relative to the amount of bandwidth allocated therewith.

24. The wireless communications apparatus of claim 19, further comprising means for utilizing a bisection search algorithm to solve the following:

$$\max. \sum_{i=1}^{n} U_i((1-\tau\alpha_i)x_i(t) + \tau\alpha_i K_i(t)b_i) - W \sum_{i=1}^{n} c_i g(q_i(t) - b_i K_i(t))$$

$$\text{s.t.} \sum_{i=1}^{n} b_i = B, b_i \geq 0, i = 1, \ldots, n$$

$$K_i(t)b_i \leq q_i(t), i = 1, \ldots, n$$

wherein $U_i(\ )$ is a utility function which measures the best effort flow as a function of an average rate at which it is served, $\tau$ is a length of one subframe, $\alpha_i$ is a weight for updating an average, $x_i$ is an average rate of a flow i, $c_i$ is a weight for a cost function for flow i, $b_i$ is a spectral resource of a flow i, $g(\ )$ is a cost function based on a queue length, and B is a spectral resource.

25. The wireless communications apparatus of claim 24, further comprising:
means for initializing $B^{min}=0, B^{max}=B$;
means for setting $B^{BE}=(B^{max}+B^{min})/2$, $B^{QoS}=B-B^{BE}$; and
means for computing an optimal distribution of spectral resources $B^{BE}$ among best effort flows and $B^{QoS}$ among delay sensitive flows using a burst size algorithm.

26. The wireless communications apparatus of claim 25, further comprising:
computing $x=W \max\{f_i(q_i(t), d_i(t), K_i^j(t))\}$; means for computing first largest $y=K_i(t)U'_i(1-\tau\alpha_i)x_i(t)\tau\alpha_i K_i(t)b_i)$, wherein $U'_i(\ )$ is a derivative of the utility function $U_i(\ )$;
means for computing a second largest $z=K_i(t)U'_i((1-\tau\alpha_i)x_i(t)+\tau\alpha_i K_i(t)b_i)$; and
means for implementing the following:

```
If y ≤ x ≤ z or B^max - B^min < ò, where ò is tolerance
    Stop
```

-continued

```
Else if x > y
       B^max = B^BE, and set B^BE = (B^max + B^min) / 2, B^QoS = B - B^BE
Else
       B^min = B^BE, and set B^BE = (B^max + B^min) / 2, B^QoS = B - B^BE.
```

27. The wireless communications apparatus of claim 19, further comprising means for adapting the bandwidth allocation for at least one of the first portion of bandwidth or the second portion of bandwidth on a slow time scale.

28. A computer program product, comprising:
a non-transitory computer-readable medium comprising:
code for causing at least one computer to receive a delay sensitive flow with a delay requirement;
code for causing at least one computer to receive a best effort flow;
code for causing the at least one computer to allocate a first portion of bandwidth to the delay sensitive flow;
code for causing the at least one computer to allocate a second portion of bandwidth to the best effort flow;
code for causing the at least one computer to reallocate the first portion of bandwidth to a reduced level of bandwidth and the second portion of bandwidth to an increased level of bandwidth if the delay requirement is met;
code for causing the at least one computer to reallocate the first portion of bandwidth to an increased level of bandwidth and the second portion of bandwidth to a reduced level of bandwidth if the delay requirement is not met; and
code for causing the at least one computer to maintain a level of bandwidth for the first portion of bandwidth and the second portion of bandwidth if the delay requirement is equivalent to the first portion of bandwidth;
wherein the reallocation of bandwidth for the first portion of bandwidth is served by $Wf_i(q_i(t), d_i(t), d_i(t), K_i^j(t))$, where $f_i$ is a delay sensitive flow, W is a relative weight between priorities of best effort users and priority of delay sensitive flow users, i is a sub-band index, $d_i(t)$ is a head-of-line delay for a flow, the $q_i(t)$ is a buffer size, and the $K_i^j(t)$ is a spectral efficiency for a flow i at a time t.

29. The computer program product of claim 28, wherein the non-transitory computer-readable medium further comprising code for causing the at least one computer to receive at least one data packet in accordance with the bandwidth allocation of the first portion of bandwidth and the second portion of bandwidth.

30. The computer program product of claim 28, wherein the non-transitory computer-readable medium further comprising code for causing the at least one computer to transmit at least one data packet in accordance with the bandwidth allocation of the first portion of bandwidth and the second portion of bandwidth.

31. The computer program product of claim 28, wherein the non-transitory computer-readable medium further comprising code for causing the at least one computer to adjust the allocation of bandwidth for each data packet.

32. The computer program product of claim 28, wherein the reallocation of bandwidth for the second portion of bandwidth is served by a marginal utility of the best effort flow relative to the amount of bandwidth allocated therewith.

33. The computer program product of claim 28, wherein the non-transitory computer-readable medium further comprising code for causing the at least one computer to utilize a bisection search algorithm to solve the following:

$$\max. \sum_{i=1}^{n} U_i((1 - \tau\alpha_i)x_i(t) + \tau\alpha_i K_i(t)b_i) - W \sum_{i=1}^{n} c_i g(q_i(t) - b_i K_i(t))$$

$$\text{s.t.} \sum_{i=1}^{n} b_i = B, b_i \geq 0, i = 1, \ldots, n$$

$$K_i(t)b_i \leq q_i(t), i = 1, \ldots, n$$

wherein $U_i(\ )$ is a utility function which measures the best effort flow as a function of an average rate at which it is served, $\tau$ is a length of one subframe, $\alpha_i$ is a weight for updating an average, $x_i$ is an average rate of a flow i, $c_i$ is weight for a cost function for flow i, $b_i$ is a spectral resource of a flow i, $g(\ )$ is a cost function based on a queue length, and B is a spectral resource.

34. The computer program product of claim 33, wherein the non-transitory computer-readable medium further comprising code for causing the at least one computer to:
initialize $B^{min}=0, B^{max}=B$;
set $B^{BE}=(B^{max}+B^{min})/2$, $B^{QoS}=B-B^{BE}$; and
compute an optimal distribution of spectral resources $B^{BE}$ among best effort flows and $B^{QoS}$ among delay sensitive flows using a burst size algorithm.

35. The computer program product of claim 34, wherein the non-transitory computer-readable medium further comprising code for causing the at least one computer to:
computing $x=W \max \{f_i(q_i(t), d_i(t), K_i^j(t))\}$;
compute first largest $y=K_i(t)U'_i((1-\tau\alpha_i)x_i(t)+\tau\alpha_i K_i(t)b_i)$, wherein $U'_i(\ )$ is a derivative of the utility function $U_i(\ )$;
compute a second largest $z=K_i(t)U'_i((1-\tau\alpha_i)x_i(t)+\tau\alpha_i K_i(t)b_i)$; and
implement the following:

```
If y ≤ x ≤ z or B^max - B^min < ò, where ò is tolerance
       Stop.
Else if x > y
       B^max = B^BE, and set B^BE = (B^max + B^min) / 2, B^QoS = B - B^BE
Else
       B^min = B^BE, and set B^BE = (B^max + B^min) / 2, B^QoS = B - B^BE.
```

36. The computer program product of claim 28, wherein the non-transitory computer-readable medium further comprising code for causing the at least one computer to adapt the bandwidth allocation for at least one of the first portion of bandwidth or second portion of bandwidth on a slow time scale.

* * * * *